March 7, 1967
D. W. BAHR
3,307,355
AUGMENTATION SYSTEM FOR REACTION ENGINE
USING LIQUID FUEL FOR COOLING
Filed Oct. 31, 1961
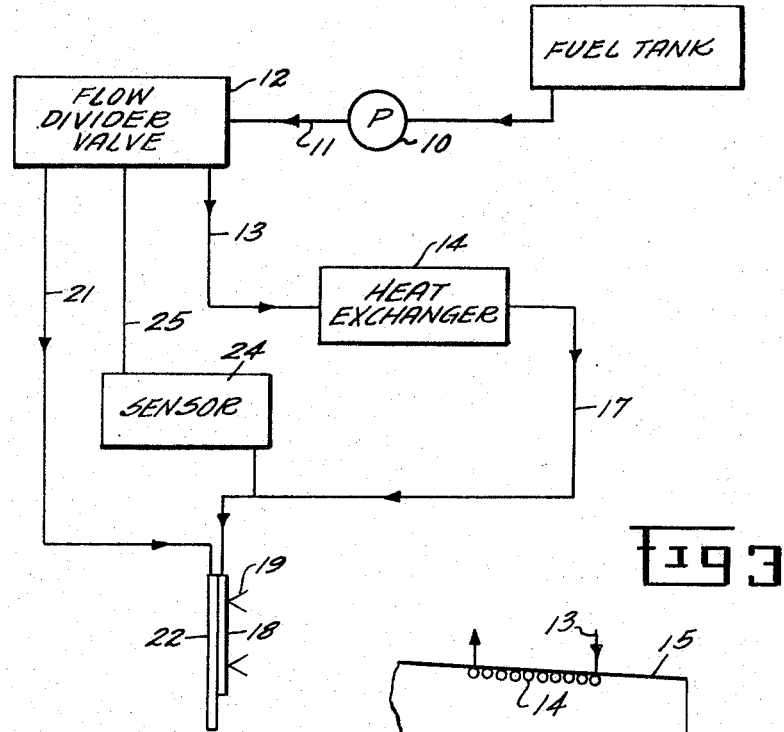
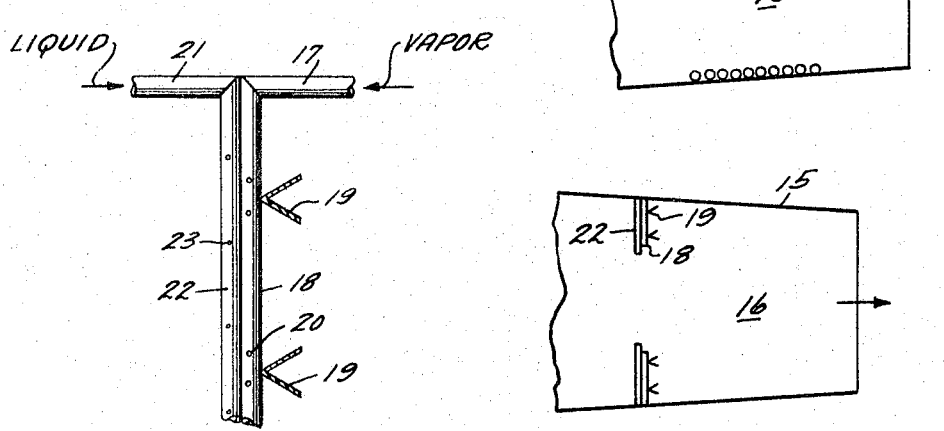
INVENTOR.
DONALD W. BAHR
BY
John F. Cullen
ATTORNEY

United States Patent Office 3,307,355
Patented Mar. 7, 1967

3,307,355
AUGMENTATION SYSTEM FOR REACTION ENGINE USING LIQUID FUEL FOR COOLING
Donald W. Bahr, Cincinnati, Ohio, assignor to General Electric Company, a corporation of New York
Filed Oct. 31, 1961, Ser. No. 148,935
6 Claims. (Cl. 60—39.71)

The present invention relates to an augmentation or fuel system for a reaction engine utilizing liquid fuel for cooling and, more particularly, to a system for use with a reaction engine wherein the fuel supplied for combustion is supplied in liquid and vapor phases.

In high flight speed air-breathing engines, extensive cooling of the hot engine parts with fuel is generally required. Because of the high speed the ambient air is too hot to be utilized as an effective heat sink and fuel is the only medium available. At some operating conditions the fuel is wholly vaporized in the process of cooling engine parts. With some engines, however, it is not always possible to vaporize all the fuel, particularly at conditions where the fuel flow rates are high. Thus, afterburners for such turbojet engines, ramjet engines, or combinations such as turbo-ramjet engines must, in some cases, be operated with mixtures of liquid and vapor fuel.

Furthermore, combustion systems for application in these engines must often operate over wide ranges of burner inlet temperatures as well as wide ranges of fuel air ratios.

In a turbo-ramjet engine, for example, the augmentor combustion system is required to operate as that of an afterburner of a turbine engine for part of the time and then as that of a ramjet engine at the higher flight speeds when the turbojet is closed off and the afterburner is converted into the ramjet for continued operation at the high flight speeds. Such combination turbo-ramjet engines are well known. During operation as a turbojet the inlet gas temperature to the afterburner is quite high. When the turbojet is isolated from the system and operation is on the ramjet alone the inlet temperature is considerably cooler because now the inlet air temperature is dependent entirely on aerodynamic heating due to the aircraft flight through the atmosphere. In other words, on turbojet operation the afterburner must operate under high inlet air temperature conditions and on ramjet operation the combustion system must operate under generally lower temperature air inlet conditions.

Additionally, such engines must be able to operate over very wide ranges of fuel-air ratios from very lean overall mixtures to overall stoichiometric mixtures to provide the thrust modulation necessary.

Because of the high velocity of the combustion system inlet air, it is customary in all such engines to use conventional V-gutters or their equivalent to provide a stagnation zone at which combustion may take place. In turbojet engines with afterburners the fuel is often injected either as a liquid or as a vapor closely adjacent the V-gutter. The reason for this is that the inlet air to the afterburner is at such high temperature that it is necessary to inject the fuel closely adjacent the V-gutter to avoid ignition occurring between the fuel injector and the V-gutter and possible burning out of the V-gutter structure in the afterburner. On the other hand, in ramjet operation, where the inlet air temperature is low the fuel is usually injected considerably upstream of the V-gutter to allow it to mix with the air and reach suitable burning conditions at the V-gutter. Thus, the conditions for combustion in the combination engines are mutually exclusive, in one case requiring injection at the V-gutter because of the high inlet temperatures and in the other, or ramjet case, requiring upstream injection considerably ahead of the V-gutter to insure proper combustion performance. A further difficulty is that in such high speed engines, where fuel is used for cooling, it is extremely difficult to vaporize all of the fuel at all engine operating conditions and thus sustain high combustion performance levels at all required flight conditions.

Duel systems have been provided in the prior art which operate to meet these mutually exclusive conditions. This is generally accomplished by providing dual sets of fuel injectors. One set is provided upstream of the flameholders for ramjet operation at the low inlet air temperatures and a separate system is provided downstream at the V-gutters for afterburner operation on the turbojet portion of the flight. This dual system, of course, adds complexities of control as well as weight and is, therefore, not desirable. A system is desired which uses a single fuel injector arrangement under these mutually exclusive conditions which injector arrangement can operate over wide ranges of inlet air temperatures and fuel-air ratios and still burn with good combustion efficiency.

The main object of the present invention is to provide an augmentation or combustion system for a reaction engine which will operate over wide ranges of inlet air conditions and fuel-air ratios.

Another object is to provide such a system which is not sensitive to the vapor-liquid split of the total fuel supply which is obtained from fuel cooling of the engine.

A further object is to provide such a system for an engine which uses fuel for cooling and provides an arrangement for supplying liquid and vapor fuel to a single injector arrangement at the V-gutter structure.

Briefly stated, the invention provides an augmentation system for a reaction engine which uses liquid fuel for cooling wherein the liquid fuel supply is directed through a flow divider to split the liquid into two selected liquid quantities. One flow is directed to the combustion zone as liquid where it is sprayed into the combustion zone substantially at the V-gutters. The other liquid flow is passed through a heat exchanger which is used to cool any suitable part of the engine requiring cooling (such as by a coil around the combustion chamber) and then is directed as vapor into a vapor fuel injector adjacent the liquid fuel injector in the combustion zone. Sensing means such as temperature sensing structure is connected to the vapor line and to the flow divider to sense the temperature from the heat exchanger and adjust the flow to the heat exchanger accordingly. The vapor fuel thus supplied is used to establish a pilot flame on the V-gutter flameholders and the liquid fuel is used as a fill fuel between the vapor fuel injection locations. The use of the vapor fuel in this manner permits efficient combustion operation with a single injection arrangement over wide ranges of inlet air temperatures and fuel-air ratios. In addition, the use of the vapor and liquid fuel streams in this manner permits efficient combustion operation with substantially any division of the total fuel supply into liquid and vapor with a single, as opposed to a dual injection arrangement.

While the specification concludes with claims particularly pointing out and distinctly claiming the subject matter which I regard as my invention, it is believed the invention will be better understood from the following description taken in connection with the accompanying drawing in which:

FIGURE 1 is a schematic illustration of the system for splitting and adjusting the fuel flow of the present invention, FIGURE 2 is a partial view of a typical integral fuel injector flameholder used in the present system, FIGURE 3 is a partial view of a typical heat exchanger used for engine cooling of one element such as the combustion chamber walls of an afterburner; and, FIGURE 4 is a partial view of the combustion zone showing the arrangement of the fuel injectors and V-gutters as contemplated by the instant invention.

The present invention is based on the assumption that a high Mach reaction engine is used and that the liquid fuel is utilized for cooling parts of the engine. The reason for this is that at the high flight Mach speeds the ambient air is not an adequate cooling agent and the only suitable medium available for cooling is fuel. As such, fuel cooling in high speed engines is not new and it is merely in this environment that the present system is employed to avoid the dual arrangements heretofore required and provide the wide range operations necessary without any sacrifice in high combustion performance. It should be understood that the present system is usable in any reaction engine wherein the liquid fuel may be vaporized either deliberately for better combustion or through a cooling arrangement to cool engine parts. However, since it avoids the dual systems necessary in engines that operate under high inlet air temperatures and low inlet air temperatures it is especially applicable to such engines although not limited thereto.

Referring first to FIGURE 1 there is shown a fuel supply which may come from any suitable source such as the aircraft wing tanks. The fuel supply is directed from a source through a connecting line 11 to a pump 10 and then to a flow dividing means 12 which may conventionally be in the form of a flow dividing valve. The purpose of the flow dividing valve is to separate the liquid fuel into two selected quantities as required. One such quantity is directed through line 13 to a heat exchanger 14 where it is vaporized by the absorption of heat. It is to be understood that heat exchanger 14 may be any part of the engine that requires cooling and can adequately use the liquid fuel for that purpose. A typical illustration is shown in FIGURE 3 wherein the heat exchanger may comprise tubes wrapped around the afterburner 15 in order to cool the afterburner walls from the heat of the combustion zone 16. This is merely illustrative and other parts of the engine may be similarly cooled and form the element 14 as required by the system. The vaporized fuel leaving heat exchanger 14 is directed by a line 17 to a vapor fuel injector 18 that is disposed at the location of the conventional V-gutters 19 as shown. Vapor injection on the V-gutters is obtained by suitable arrangements such as through apertures 20 as shown in an enlarged view of the injection structure in FIGURE 2. This vapor fuel injection is called the pilot fuel since it forms an aura of flame about the V-gutters in a conventional manner. Thus, a stabilized flame is provided at the V-gutters.

The second quantity of liquid fuel is directed from flow dividing means 12 through line 21 to a second liquid fuel injector 22 that is disposed preferably upstream of and closely adjacent the vapor fuel injector 18. By the words "closely adjacent" it is intended to connote the fact that the fuel injectors are essentially a one-piece structure. Preferably they will be brazed together as shown in FIGURE 2 although it is possible to separate them a slight distance and the term is intended to imply this rather than the relatively large spaced distance that occurs in the dual systems wherein a set of injectors is provided upstream of the V-gutters and a second set is provided downstream at the V-gutters. Thus, the term is intended to mean fuel injection substantially at the V-gutters as shown in FIGURE 2. Again, liquid fuel is injected through apertures 23 as fill fuel preferably between apertures 20 of the vapor injector 18 so that satisfactory mixing for high combustion efficiency occurs.

In order to maintain vapor in injector 18 at all times, sensing means 24 which may conveniently take the form of a temperature sensing device is provided in the line 17 between the heat exchanger 14 and the vapor injector 18. The sensing means 24 adjusts the flow to the heat exchanger 14 by a conduit 25 back to the flow dividing means 12.

Sensing means 24 will normally be set to provide pure vapor in line 17 to the vapor injector 18. For example, if the heat load does not provide complete vaporization of the liquid fuel entering heat exchanger 14 sensing means 24 will sense a lower temperature by reason of the presence of liquid fuel in the vapor in line 17 from the outlet of the heat exchanger and will reduce the liquid flow through line 13 so that all the fuel is vaporized. The portion of the fuel flow which is prevented from entering line 13 will be diverted to the liquid fuel injector 22 through line 21. Conversely, if the vapor temperature is too high, sensing means 24 admits more liquid fuel to the heat exchanger to reduce the vapor temperature to the desired operating level.

Suitable liquid and vapor injectors may be used with the system disclosed in FIGURE 1 and a particular injector that has been used successfully with this system but is usable also with any other system that may supply liquid and vapor is disclosed and claimed in co-pending application Serial No. 149,023 filed October 31, 1961, and assigned to the assignee of the instant invention. In that application a specific injector that has been highly successful in operation is disclosed and claimed.

Injection of fuel in the combustion zone 16 may be in any suitable manner as typically illustrated in FIGURE 4 wherein the injectors 18 and 22 extend radially into the combustion zone around the afterburner 15 and have circular spaced V-gutters 19 attached thereto. Radial injection structures are generally well known and no invention is claimed in such arrangement. The system disclosed in FIGURE 1 is a system that operates over wide ranges of conditions such as in a turbo-ramjet with a single fuel injection system that operates at the low air inlet temperature of the ramjet and also at the high inlet air temperature of the torbojet afterburner without the use of the dual systems of injectors for injection upstream in the ramjet mode of operation and downstream in the afterburner mode of operation. Furthermore, it is applicable to operation over wide ranges of fuel-air ratios which is important in thrust modulation and does not require separate sets of spray bars to stratify the fuel. At the same time, the pilot vapor fuel injection from injector 18 provides a burning zone at the V-gutters 19 at all times so that the fill fuel from liquid fuel injector 22 is ignited soon after its injection. This efficient combustion is obtained whether a lean mixture is desired, wherein both vapor and liquid fuel are injected in this arrangement, or whether a stoichiometric mixture is desired where vapor and liquid injection also occur at the flameholder. Because of the vapor injection at the flameholder and the aura of flame about it proper mixing is obtained of the liquid fuel for good combustion efficiency without a long mixing distance being required.

The system of FIGURE 1 is generally designed to supply at least 20 percent of the total fuel flow as vapor at vapor injector 18 although it is operable with up to 100 percent of total fuel flow being supplied as vapor. The 20 percent limit is provided to insure the aura of flame around the V-gutters under all operating conditions. Less than that does not provide a sufficient pilot flame at the V-gutters for complete ignition and rapid burning of the liquid fuel from injector 22 and thus poor combustion efficiency is obtained. In general, if operation at very lean fuel-air ratios is required, such as at fuel air ratios much less than 0.02, it is desirable to supply a greater percentage of the total fuel supply as vapor to obtain high combustion performance levels. In most engine applications of this kind, it is usually difficult to prevent the vaporization of large percentages of the total fuel supply at these operating conditions because of the low total fuel flow rates at these overall lean fuel-air ratio operating conditions.

It is also to be noted that at high Mach number conditions fuel flow is often low as compared to take-off and low Mach number conditions and yet the cooling requirements are most severe at the high Mach conditions. Complete vaporization generally occurs at these flight conditions because the fuel flow is low whereas the cooling requirements are high. Thus, with the same heat transfer area in heat exchanger 14 it is normally not possible to vaporize all the fuel at other flight conditions and the fuel normally issues as a mixture of vapor and liquid which is undesirable and results in poor fuel distribution and, therefore, poor combustion efficiency unless suitable means of separating the liquid from the vapor and of separately injecting the liquid are used. However, the present system, by sensing means 24, adjusts the fuel flow according to the heat load of the heat exchanger. Thus, the injector-flameholder of the system permits efficient operation with widely varying mixtures of vapor and liquid fuel and is not sensitive to the operation of the heat exchanger equipment. That is to say, it is possible in the present system to operate with only a small portion of the fuel being vaporized and injected as a local fuel as well as operating with the local fuel being completely vaporized so the system is not sensitive to any particular ratio between liquid and vapor.

While I have hereinbefore described a preferred form of my invention, obviously many modifications and variations of the present invention are possible in the light of the above teachings. It is therefore to be understood that within the scope of the appended claims, the invention may be practiced otherwise than as specifically decribed.

I claim:
1. In an augmentation system for a reaction engine utilizing a supply of liquid fuel for cooling and including a vapor fuel injector and a liquid fuel injector,
 (a) a flow dividing means having an inlet means and first and second outlet means, said inlet means being connected to the liquid fuel supply to receive liquid fuel therefrom, said flow dividing means proportionately dividing the liquid fuel into first and second selected quantities,
  (1) said first selected quantity of liquid fuel being supplied at said first outlet means and being at least a predetermined minimum amount and
  (2) said second selected quantity of liquid fuel being supplied at said second outlet means,
 (b) a vapor fuel system including first means for supplying completely vaporized fuel to said vapor fuel injector and
 (c) a liquid fuel system including second means for supplying completely liquid fuel to said liquid fuel injector,
 (d) said first means including,
  (1) heat exchange means having a variable rate of vaporization of at least a predetermined minimum amount, said heat exchange means having an upstream connection and a downstream connection, said upstream connection being connected to said first outlet means of said flow dividing means to receive said first selected quantity of liquid fuel within said heat exchange means for complete vaporization thereof, said vapor fuel injector being connected to said downstream connection of said heat exchange means to receive the completely vaporized fuel therefrom for establishing a pilot flame at V-gutters in a combustion zone, and
  (2) sensing means in the connection between said heat exchange means and said vapor fuel injector, said sensing means being connected to said flow dividing means for adjustment of the proportional division effected thereby such that said first selected quantity of liquid fuel is supplied at a rate in accordance with said variable rate,
 (e) said second means connecting said liquid fuel injector to said second outlet means of said flow dividing means to receive said second selected quantity of liquid fuel therefrom, said liquid fuel injector being disposed closely adjacent said vapor fuel injector such that said second selected quantity of liquid fuel is injected by said liquid fuel injector substantially directly into said combustion zone.

2. Apparatus as described in claim 1 wherein said flow dividing means is a flow divider valve.

3. Apparatus as described in claim 1 wherein said sensing means is a temperature sensing means to sense the vapor temperature from said heat exchanger.

4. Apparatus as described in claim 1 wherein said flow dividing means is a flow divider valve and said sensing means is a temperature sensing means to sense the vapor temperature from said heat exchanger.

5. Apparatus as described in claim 1 wherein said liquid fuel injector is disposed closely adjacent and upstream of said vapor injector in the combustion zone.

6. Apparatus as described in claim 1 wherein said flow dividing means is designed to supply at least 20 percent of said fuel supply as said predetermined minimum amount of said first selected quantity of fuel.

References Cited by the Examiner

UNITED STATES PATENTS

| | | | |
|---|---|---|---|
| 780,493 | 8/1957 | Carlisle et al. | 60—39.74 |
| 2,907,527 | 10/1959 | Cummings | 60—39.71 |
| 2,955,420 | 10/1960 | Schirmer | 60—39.71 X |
| 3,000,176 | 9/1961 | Kuhrt | 60—39.71 X |
| 3,024,606 | 3/1962 | Adams et al. | 60—39.74 X |
| 3,052,095 | 9/1962 | Prachar | 60—35.6 |

JULIUS E. WEST, *Primary Examiner.*

SAMUEL FEINBERG, SAMUEL W. ENGLE,
*Examiners.*

G. L. PETERSON, *Assistant Examiner.*